UNITED STATES PATENT OFFICE.

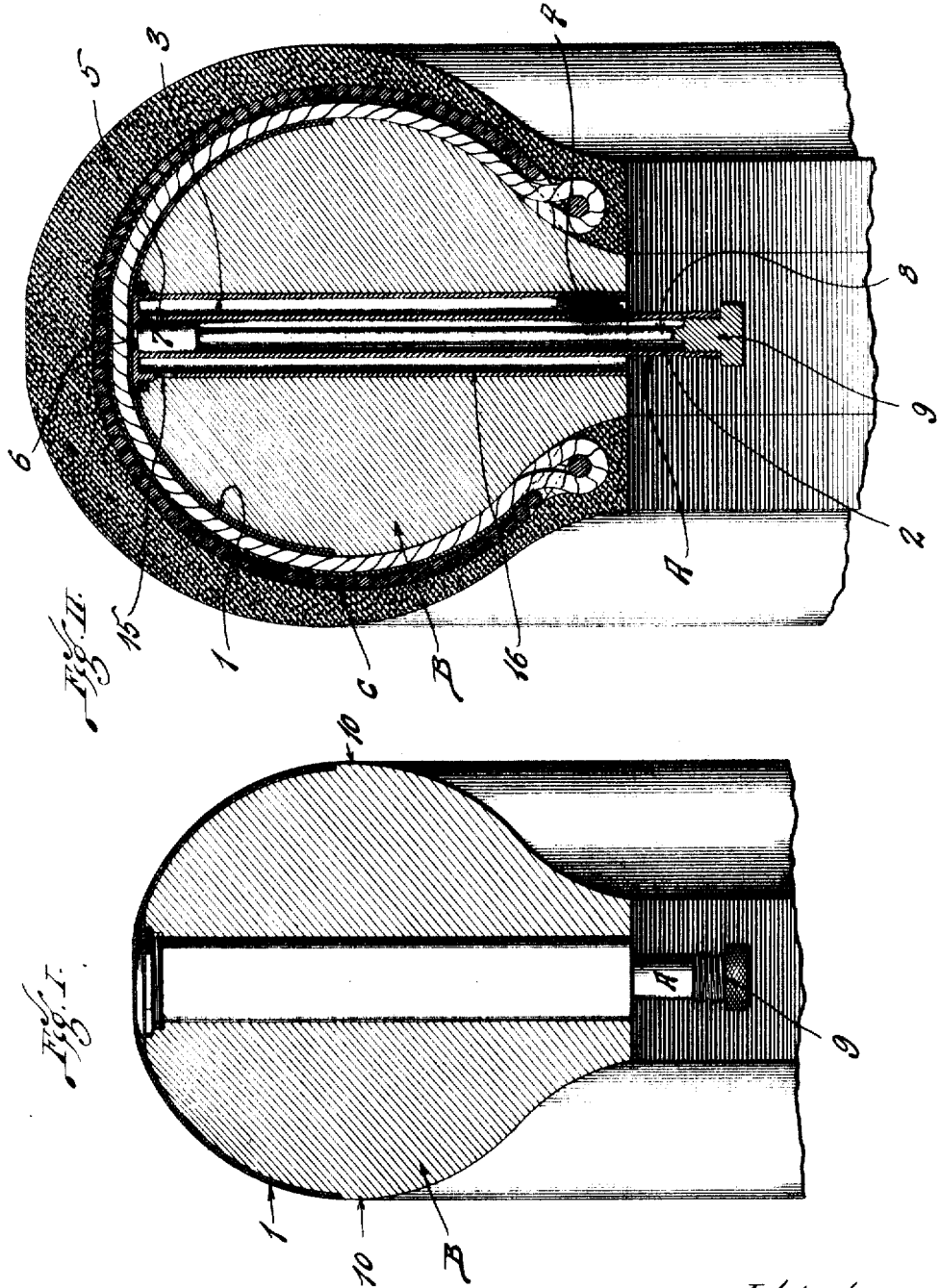

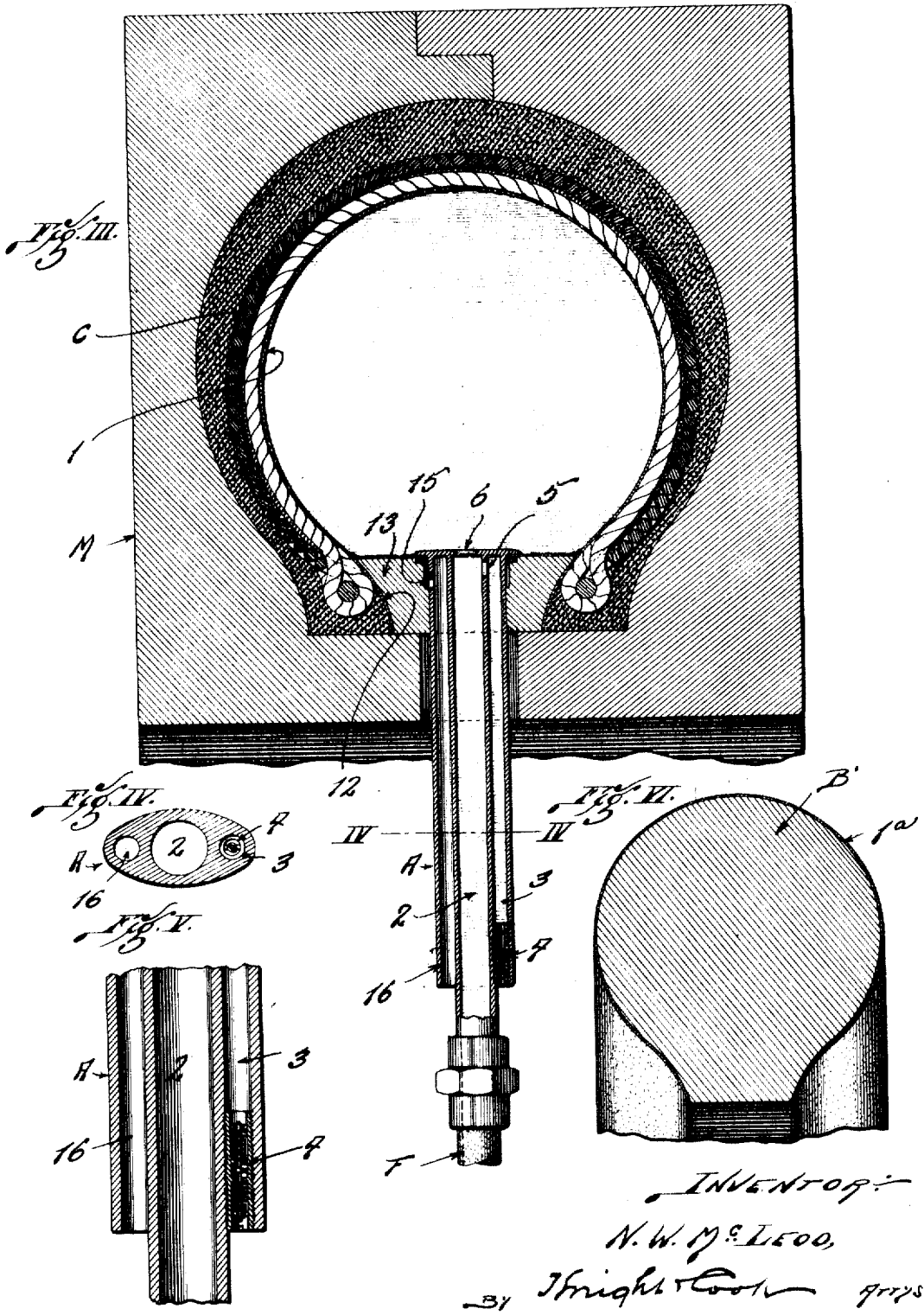

NELSON W. McLEOD, OF ST. LOUIS, MISSOURI.

METHOD OF MAKING PNEUMATIC TIRES.

1,266,967.  Specification of Letters Patent.  Patented May 21, 1918.

Application filed June 19, 1916. Serial No. 104,601.

*To all whom it may concern:*

Be it known that I, NELSON W. McLEOD, a citizen of the United States of America, a resident of the city of St. Louis, State of Missouri, have invented certain new and useful Improvements in Methods of Making Pneumatic Tires, of which the following is a full, clear, and exact description, reference being had to the accompanying drawings forming a part of this specification.

My invention relates to a method of making pneumatic rubber tires, the main object being to produce a simple and absolutely positive method of preventing the permeation of fluid into raw rubber tire structures when they are subjected to the internal pressure of a fluid before or during the vulcanizing operation.

Patent No. 1,029,307, issued June 11, 1912, to the American Tire Company, discloses a method whereby a raw tire is placed in a mold and then expanded by introducing fluid under pressure into the raw tire to place the elements of the tire skeleton under tension, thus compensating for defects and irregularities by adjusting the tire skeleton and tightening all of its elements while they are free to yield in the raw rubber. A tire made in this manner is very strong and durable, the skeleton being so adjusted before vulcanization that its elements act as a very firm unit in resisting the internal pressure and other stresses to which the tire is subjected in service. However, while the raw tire is being expanded, the fluid under pressure tends to permeate the tire structure, and since this would materially injure the tire, great care has been exercised and expensive means have, heretofore, been utilized to prevent such permeation.

By carrying out my new method, the raw or unfinished tire is provided with an impermeable lining capable of preventing fluid under pressure from leaking into the tire skeleton. It is to be understood that this new method is adapted to be followed in connection with the patented method referred to above, and that it may be carried out in connection with various other methods to produce a tire having the lining hereinafter described.

By preference the invention comprises the step of partially vulcanizing a tire lining to render it impermeable, thereafter forcing the partially vulcanized lining against the inner face of a raw or unfinished tire structure by directing fluid under pressure against the partially vulcanized lining, at the same time subjecting the unfinished tire to the pressure of the fluid and thereafter completely vulcanizing all of the rubber, to integrally unite the lining with the tire structure. The partially vulcanized lining very effectively overcomes the tendency of the fluid to permeate the tire structure. Tire skeletons are usually lined with a thin layer or coating of rubber, and I preferably partially vulcanize the rubber of this layer before applying it to the tire, thus avoiding the expense of an added element in producing the impermeable lining. By making this lining a permanent part of the tire, I also avoid the cost of material and the labor and expense of removing the impermeable element of the unfinished tire. To accomplish this in a highly satisfactory manner, the rubber compound of the lining is preferably different from that of the raw tire, more time being required to completely vulcanize the lining, so all of the rubber will be vulcanized uniformly when the lining becomes an integral part of the tire.

The fluid utilized in expanding the tire and holding the rubber under pressure, is preferably water, and since it is necessary to vent the air from the interior of the tire when the water is introduced into the impermeable lining to insure uniform vulcanization, I preferably make the lining in the form of an annular tube, and after placing the tire and lining in a vulcanizing mold the water is introduced into the lining to inflate it, the air being permitted to escape through a suitable vent. The water is confined in the partially vulcanized tube and cannot accidentally escape at the air vent nor at any other point.

Figure I is a transverse section of an annular tire forming core having one of my tire lining tubes in deflated condition on its peripheral face.

Fig. II is a view similar to Fig. I showing an uncured tire in position on the annular core.

Fig. III is a tranverse section of an annular vulcanizing mold, showing the tire and its lining arranged therein.

Fig. IV is an enlarged transverse section taken approximately on line IV—IV, Fig. III.

Fig. V is an enlarged fragmentary longitudinal section of a portion of the stem through which fluid is discharged into and vented from the lining and tire.

Fig. VI is a transverse section illustrating a modification.

In Figs. I, II and III, I have shown a tire lining in the form of an annular tube adapted to receive fluid under pressure and adapted to be forced against the inner face of a tire and integrally united therewith. In accordance with a preferred form of the invention, the lining tube 1 is made of sheet rubber and partially vulcanized to prevent the permeation of fluid therethrough before and during the vulcanizing operation. The partially vulcanized tube is collapsed or deflated by removing the air through a stem A secured to the tube. A vacuum pump, or suction pipe, may be coupled onto the threaded end of a stem A for the purpose of drawing air through the passageway 2 in said stem. A vent passageway 3, formed in the stem A is provided with a double acting check valve 4 (Figs. II and V) adapted to close automatically in response to the suction or partial vacuum in the passageway 2. A port 5 formed near the inner end of stem A furnishes communication between the passageways 2 and 3. Oppositely disposed springs, surrounding the stem of the valve 4, tend to retain said valve in its neutral, or open, position, shown most clearly in Fig. V, but when the air is drawn quickly from the tube 1, through the passageway 3, a partial vacuum will be created in the passageway 3, thus closing the valve 4.

After the partially vulcanized lining tube 1 has been deflated, the port 6, at the inner end of passageway 2, is closed by a piston valve 7, (Fig. II) to prevent the admission of air to the deflated tube. The piston valve 7 has a stem 8 provided with a screw threaded head 9 adapted to be screwed into the outer end of the passageway 2 to force the valve 7 to its seat.

The next step of the method, illustrated by Figs. I to V, is to place the deflated lining tube on the peripheral face of a collapsible tire forming core B, as shown most clearly in Fig. I, the core being so formed that the outer face of the deflated tube will lie flush with the side faces 10 of the core. The unlined tire skeleton C is then formed on the annular core B, around the lining tube 1. This skeleton may be made of rubberized cord, canvas, or any other suitable material and it may be applied to the core and lining tube in any suitable manner. It will be noted, however, that the skeleton may be readily formed on the core B in the usual manner, and that no air will be accidentally admitted to the deflated lining tube, the port 6 at the inner end of said tube being at this time closed by the valve 7.

After the skeleton C has been covered with raw rubber, the core B is removed from the unfinished tire casing, and the deflated lining tube will then be retained in the position shown in Fig. II by adhering to the rubberized skeleton. Narrow strips 12, preferably of raw rubber, are placed onto the opposing inner faces of the tire at the inner margins of the unfinished structure, and an abutment ring or bull ring 13 is then interposed between said inner margins, as shown in Fig. III. The rubber strips 12 extend inwardly from the inner edges of the tire casing to points beyond said abutment ring.

The structure is now preferably placed in a tire mold M, (Fig. III) and the valve 7 (Fig. II) which has heretofore prevented the admission of air to the collapsed lining tube, is then withdrawn from the stem A to provide for the admission of water to the lining tube.

It is a well recognized fact that water is a most desirable fluid for the transmission of pressure and vulcanizing heat to a tire during the vulcanizing operation, but the highly desirable results cannot be obtained if the water is permitted to permeate the tire structure, nor can the tire be as successfully cured if a large volume of air is present in the tire with the water. I, therefore, vent the air from the inlet passageway 2 before admitting water to the deflated tube.

Immediately after the core B and valve 7 have been removed from the structure, the deflated tube 1 and its stem A occupy the position shown in Fig. II, and while the stem is in this position, a water supply pipe F is screwed onto the threads at the outer end of passageway 2. The water flowing toward the deflated tube 1 will force the air in advance of the water into the passageway 2, through the port 5 at the inner end of said passageway, into the vent passageway 3 and around the double acting valve 4 to the atmosphere. While the air is passing slowly around the valve 4, the latter will occupy the neutral or open position, shown in Fig. V, and after all of the air has been expelled the body of water will strike said valve and close it. The water will flow into the tube 1, gradually filling said tube and placing it in the condition shown in Fig. III. While the tube 1 is being distended by the water, air is gradually vented from the space between the tube and the tire skeleton, by flowing into a port 15 near the inner end of the stem A and through a discharge passageway 16 leading to the atmosphere.

Upon the completion of the steps previously described, the lining tube is completely filled with water; its outer face firmly engages the strips of rubber 12 which extend beyond the abutment ring 13. It is to be understood that the rubber strips 12 and the inner margins of the tire casing are firmly clamped between the abutment ring 13 and the mold M.

If the method described in the prior Patent, No. 1,029,307, is to be followed, the raw or uncured tire will be smaller than the mold cavity, and the next step may consist in stretching the tire skeleton by placing its elements under tension, for instance, to approximately the limit of their elasticity, by the pressure of the water against the impermeable lining. But whether this method is followed or not, the pressure of the water may be utilized to firmly force the impermeable lining against the inner face of the uncured tire, at the same time firmly forcing the outer face of the structure against the mold, thereby placing all of the rubber under the pressure necessary for satisfactory vulcanization. All of the rubber is then completely vulcanized by heating the structure in a vulcanizing pot, or in any other suitable manner.

The lining sheet, formed by the tube 1, becomes an integral part of the tire structure, and it is integrally united with the rubber lining strips 12 at the inner margins of the tire. The rubber compound of the tube or lining sheet 1 is preferably less readily vulcanizable than the rubber with which the skeleton is covered, the object being to avoid injurious over vulcanization at the lining sheet, and since this lining member is subjected to a preliminary vulcanizing operation, its components are preferably so compounded that it will be completely vulcanized during the added period of time required for the complete vulcanization of the raw rubber on the tire skeleton.

After the water and abutment ring 13 have been removed from the vulcanized structure, the inner margin of the tube 1, which bridges the separable edges of the tire, may be quickly severed from the rubber strips 12 by the use of the ordinary trimming knife now generally used for similar trimming operations.

While I have very specifically described a preferred method of obtaining the advantages of an impermeable tire lining, I am aware that beneficial results may be derived from various modifications of the method described. For example, an impermeable lining sheet 1ª (Fig. VI) may be formed on the core B′, and thereafter inserted into the skeleton of an unfinished tire.

Furthermore, the step of subjecting a tire lining to a preliminary vulcanizing operation may be performed in any suitable manner and at any suitable time relative to the other steps of the method.

I claim:—

1. The method of making pneumatic tires which comprises forming a tire lining, treating said lining to render it impermeable when resting against the inner wall of an unfinished pneumatic tire structure having separable edges at its inner margin, forcing the impermeable lining against the inner face of the unfinished tire structure having separable edges at its inner margin by fluid pressure, subjecting the unfinished tire structure to fluid pressure, vulcanizing the rubber, and thereafter opening said lining adjacent the separable edges of the tire structure.

2. The method of making pneumatic tires which comprises partially vulcanizing a lining for an unfinished tire having separable edges at its inner margin to render said lining impermeable when resting against the inner wall of the unfinished pneumatic tire structure, forcing fluid under pressure into the unfinished tire and against the partially vulcanized lining, at the same time subjecting the unfinished tire to the pressure of said fluid, vulcanizing the rubber, and thereafter opening said lining adjacent the separable edges of the tire structure.

3. The method of making pneumatic tires which comprises forming a tire lining, partially vulcanizing said lining to render it impermeable when resting against the inner wall of an unfinished pneumatic tire structure having separable edges at its inner margin, forcing the partially vulcanized lining against the inner face of the unfinished tire by introducing fluid under pressure against the partially vulcanized lining, at the same time subjecting the tire to the pressure of the fluid, vulcanizing the rubber, so as to integrally unite the lining with the rubber of the tire, and thereafter opening said lining adjacent the separable edges of the tire structure.

4. The method of making pneumatic tires which comprises forming a sheet rubber tire lining, partially vulcanizing said sheet rubber tire lining, subjecting an unfinished tire having separable edges at its inner margin to the pressure of a fluid by introducing the fluid under pressure against the partially vulcanized sheet rubber lining, firmly forcing the partially vulcanized lining against the inner face of said unfinished tire, completely vulcanizing the lining and the other rubber elements of the tire, so as to integrally unite the lining with said rubber elements, and thereafter opening said lining adjacent the separable edges of the tire structure.

5. The method of making pneumatic tires which comprises forming a lining sheet, partially vulcanizing said lining sheet, forming a rubberized tire skeleton having separable edges at its inner margin around the partially vulcanized lining sheet, subjecting the rubberized tire skeleton to the pressure of a fluid directed against the partially vulcanized lining sheet, firmly forcing the partially vulcanized lining sheet against the inner face of the rubberized tire skeleton and completely vulcanizing the rubber elements so as to integrally unite the lining sheet with the rubberized tire skeleton, and thereafter opening said lining adjacent the separable edges of the tire structure.

6. The method of making pneumatic tires which consists in arranging an impermeable annular tube, comprising a tire lining, within an unfinished annular tire skeleton, introducing fluid under pressure into said tube to force said lining against the inner face of said skeleton, vulcanizing said lining to said skeleton, and thereafter opening said tube at the inner margin of the tire.

7. The method of making pneumatic tires which consists in arranging an impermeable annular tube, comprising a tire lining, within an unfinished annular tire skeleton, introducing fluid under pressure into said tube to force said lining against the inner face of said skeleton, vulcanizing said lining to said skeleton, and thereafter removing the portion of said annular tube located at the inner margin of the tire structure.

8. The method of making pneumatic tires which comprises forming an inflatable rubber tube to produce tire lining, forcing said tube against the inner face of an unfinished tire casing having separable edges by introducing fluid under pressure into the tube, at the same time subjecting the unfinished tire to the pressure of the fluid, and vulcanizing the rubber of the tire and tube so as to integrally unite said rubber, and thereafter cutting the tube near the separable edges of the tire casing.

9. The method of making pneumatic tires which comprises placing lining strips at the inner margins of an unfinished tire having separable inner edges, introducing fluid under pressure into an annular lining tube arranged within said casing, so as to force said lining tube against the inner face of the unfinished tire and against said lining strips, at the same time subjecting the unfinished tire to the pressure of the fluid, and vulcanizing the structure to integrally unite the lining elements therewith, and thereafter, opening the inner margin of said tube.

10. The method of making pneumatic tires which comprises placing lining strips at the inner margins of an unfinished tire having separable inner edges, introducing fluid under pressure into an annular lining tube and arranged within said tire, so as to firmly force said tube against the inner face of the unfinished tire and against said lining strips, at the same time subjecting the unfinished tire to the pressure of the fluid, vulcanizing the rubber of the tire and its lining elements to integrally unite said parts, and removing the inner marginal portion of the lining tube from the remainder of the structure.

11. The method of making pneumatic tires which comprises forming an unfinished tire and an annular rubber tube to produce a lining for said unfinished tire, introducing fluid under pressure into said tube, and at the same time venting air from the interior of the tire, subjecting the unfinished tire to the pressure of the fluid in the tube and vulcanizing the rubber of the tire and tube so as to integrally unite them.

12. The method of making pneumatic tires which comprises forming an unfinished tire and an annular rubber tube to produce a lining for the unfinished tire, collapsing said tube and removing the air therefrom, introducing fluid under pressure into said tube and at the same time venting the air from the space between the tube and tire, forcing the tube against the inner face of the tire through the medium of the fluid within the tube, at the same time vulcanizing the elements to integrally unite the tube with the tire, and thereafter removing the inner margin of the tube.

NELSON W. McLEOD.